United States Patent [19]

Sale et al.

[11] 3,800,031

[45] Mar. 26, 1974

[54] PROCESS FOR PREPARING SILICA HYDROGEL

[75] Inventors: Howard James Sale, Arnold, Md.; Alberto Delgado, Savannah, Ga.; Carroll Francis Doyle, Ellicott City, Md.

[73] Assignee: W. R. Grace & Co., New York, N.Y.

[22] Filed: Apr. 6, 1972

[21] Appl. No.: 241,841

[52] U.S. Cl. .............................. 423/338, 106/288 B
[51] Int. Cl. .............................................. C01b 33/16
[58] Field of Search .......... 423/338, 340; 106/288 B

[56] References Cited
UNITED STATES PATENTS

| | | | |
|---|---|---|---|
| 2,358,201 | 9/1944 | Behrman | 423/338 |
| 2,424,232 | 7/1947 | Gabeler | 423/338 X |
| 2,462,236 | 2/1949 | Thomas | 423/338 X |
| 2,871,099 | 1/1959 | Ziese | 423/338 |
| 3,243,262 | 3/1966 | Carr et al | 423/338 |
| 3,453,077 | 7/1969 | Hyde | 423/338 |
| 3,716,493 | 2/1973 | Acker | 423/338 |

FOREIGN PATENTS OR APPLICATIONS

| | | | |
|---|---|---|---|
| 541,212 | 5/1957 | Canada | 423/338 |

OTHER PUBLICATIONS

Chemical Abstracts, 1937, page 6950, Copy Scient. Lib.

*Primary Examiner*—Edward Stern

[57] ABSTRACT

An improved and rapid process for purifying a silica hydrogel of soluble contaminants which comprises reducing the hydrogel to a controlled particle size range and thereafter treating the sized hydrogel in a continuous three-step operation. Treatment involves first dewatering a hydrogel slurry, washing the resulting hydrogel with acidified water, followed by washing with ammoniated water. All treatment steps are carried out on a moving belt maintained under a vacuum.

11 Claims, No Drawings

PROCESS FOR PREPARING SILICA HYDROGEL

This invention relates to hydrogels and, in particular to an improved process for removing soluble impurities from silica hydrogels.

Silica gel is a versatile material which is useful in a host of applications such as an adsorbent, flatting agent in coating compositions and as a filler in diverse compositions. It is generally prepared from gel-forming ingredients which initially form a hydrosol which sets to a hydrogel. The hydrogel is processed to remove impurities and is then dried or activated at an elevated temperature. The resulting gel is characterized by a high pore volume and high surface area and is inert in the environment in which it performs its function.

Conventionally, the process of preparing the gel involves mixing an alkali metal silicate and a mineral acid or with carbon dioxide to form a silica hydrosol. Illustrative silicates include sodium silicate and potassium silicate, of which sodium silicate is preferred because of its favorable economic factor. Suitable mineral acids include sulphuric and phosphoric acids, of which sulphuric acid is generally employed. The resulting hydrosol is allowed to set to a hydrogel and reduced in pH to less than 5 pH if necessary. Next the hydrogel is broken into pieces and washed with an appropriate liquid to remove undesirable impurities and impart specific properties. It is dried and then ground or simultaneously dried and ground to a desirable particle size, depending on the use to which it is to be put.

The hydrosol is generally allowed to set in a series of stainless steel tubs, following which the resulting hydrogel is dumped from the tubs through a grid whereby the hydrogel is broken into particles having an average width ranging between about two and three inches. The normal gradation of sizes ranges from about one-twentieth inch to about three inches. The hydrogel particles are then placed in wash baskets which are provided with perforated bottoms and stacked in tiers of three baskets each. The stacks are immersed in tanks containing the washing medium where the impurities are removed from the hydrogel. Each basket is capable of processing an amount of hydrogel which is equivalent to 640 pounds of silica on a dry basis over a 36 hour period. Following completion of the washing cycle, the tanks are drained and the wash baskets are removed and drained for at least one hour prior to further processing.

The procedure of washing the hydrogel requires considerable equipment and space in order to process large amounts of material. In addition, it requires a prolonged period to complete the washing cycle in order to reduce the impurities in the hydrogel to a satisfactory level.

It is, therefore, an object of this invention to provide a process whereby the conventional practice of washing silica hydrogels may be accomplished using minimum equipment and is carried out at a more rapid rate and without impairing the quality of the product. This objective is achieved by purifying silica hydrogel having a controlled particle size in a continuous three-stage process.

In carrying out the process of this invention, predetermined amounts of a mineral acid, e.g., sulphuric acid, and a soluble alkali metal silicate, e.g., sodium silicate, are mixed to form a silica hydrosol containing between about 3 to 18 percent $SiO_2$. The sodium silicate solution may be any commercial grade having a weight ratio of $SiO_2:Na_2O$ from about 1:1 to 3.4:1. A minor amount of excess sulphuric acid on the order of about 0.6 N is included in order to prevent premature setting. The resulting hydrosol, which has a pH ranging between about 4 to 11, depending on the acid used, is deposited onto a continuous moving belt where gelation occurs in about 1 to 10 minutes. The gel sets on the belt as it moves along for a period of between about 30 to 60 minutes.

The hydrogel is discharged from the setting belt and then passed through a cutter where it is reduced to a particle size ranging between about 4 to 20 mesh. The small particle size of the hydrogel permits efficient removal of soluble impurities there from in the subsequent treatment steps because a greater surface is available for contact with the washing medium. In addition, the thickness to which the washing medium must penetrate is less than the conventional larger particles and consequently the time required to remove the soluble impurities is appreciably reduced.

Optionally, the hydrogel particles may be passed to a tank where they are admixed with water to yield a slurry having a silica content of about 6 to 12 percent. Ammonia, in the form of ammonium hydroxide, is then added in amount sufficient to raise the pH of the slurry above the neutral point, generally in the range of 8.0 to 9. The ammonia is added for the purpose of increasing the pore volume of the silica. This ammonia treatment converts a portion of the linear reinforcing silica to a spheroidal micellular silica. This treatment is necessary for a hydrogel which has been in contact with an acid media and where the silica is to have a pore volume in the range of about 1 to 2.5 cc/g. The ammoniated slurry is heated to approximately 170° to 190° F, preferably to 180° F, for from about 4 to 40 hours. The resulting silica has the larger pore volume characteristic of intermediate density (I.D.) silicas.

In the next step the hydrogel, or the ammoniated hydrogel, depending on the previous process step, is pumped onto a moving belt which is provided with a vacuum of down to about 1 mm of Hg. on the underside through which liquid components are drawn from the slurry. The degree of vacuum is not critical with a vacuum in the range of 1 to 300 mm of Hg. found to be suitable. The belt passes sequentially through three zones, with the hydrogel receiving a separate treatment in each zone. A constant partial vacuum is maintained as the hydrogel moves through the zones.

In the first zone, the hydrogel is partially dewatered as it moves along approximately the first one-third length of the belt. When it reaches the second zone, acidified water is deposited on the hydrogel bed from a series of overhead sprays. The acidified water is sprayed in an amount sufficient to maintain the bed in a saturated condition to assure thorough removal of sodium ions. The water contains about 0.5 to 5 percent of acid, preferably about 1.5 to 2.5 percent, and is heated to about 100° F to 200° F. Sulphuric acid is preferred for use in the washing medium at the second zone.

The thus-treated hydrogel moves to the third zone where the sulphate ions are removed. This is accomplished by depositing water from a plurality of overhead sprays onto the hydrogel bed in a concentration sufficient to maintain the bed in a saturated condition. The water is at a temperature of about 100 to 210° F, preferably 150 to 200° F, and is made alkaline to a pH of about 8.0 to 10, preferably 9.0 to 9.5, by the addition of ammonia in the form of ammonia or ammonium hydroxide.

Following the washing treatment, the treated hydrogel is moved to storage or for further processing. It may be dried and then ground using a hammer mill or fluid energy mill, or it may be simultaneously dried and ground using a fluid energy mill as described in U.S. Pat. No. 2,856,268.

The invention is further illustrated by the following examples.

EXAMPLE 1

A 34° Baume sodium silicate solution was mixed with a 36° Baume solution of sulphuric acid in a mixing nozzle. The respective solutions were pumped to a mixing nozzle at a combined flow rate of approximately 70 gallons per minute. An excess of sulphuric acid to the extent of 0.6 N was maintained to prevent premature setting. The resulting hydrosol was passed onto a moving belt where gelation occurred in 5 to 10 minutes, and it was allowed to set on the belt as it moved along for about 30 to 60 minutes.

The hydrogel was discharged from the belt and passed through a cutter where the particle size was reduced to a nominal range of 20 mesh (small size) to a maximum size of 4 mesh. The cut hydrogel was dropped into a tank where it was slurried in water in a ratio to give an 8 to 10 percent $SiO_2$ content. Ammonia was added to raise the pH to 8.5, and the slurry was heated to approximately 180° F for 36 hours.

The heated slurry was pumped to a moving straight-line vacuum filter belt for washing to remove the sodium sulfate and the excess sulphuric acid. As the slurry first reached the belt, it was partially dewatered on the first zone, which represented about one-third of the belt. On the second third of the belt, it was contacted with acidified water containing 1.7 percent sulphuric acid heated at 180° F for removal of sodium ions. The acidified water was passed from overhead sprays onto the hydrogel bed and the passage of water was maintained in a concentration sufficient to saturate the bed. Following this, the hydrogel moved to the final third of the belt where it was saturated with sprayed ammoniated water heated at 190°–200° F and having a pH between 9.0–9.5. It was then discharged from the filter belt and passed to storage.

The chemical and physical properties of the hydrogel processed according to the above example are compared with a hydrogel prepared according to a conventional process where washing is carried out in a 36-hour cycle using bulk tanks:

|  | Conventional Washing | Washed According to above Example |
| --- | --- | --- |
| Total volatile content, % | 68–70 | 71–73 |
| $Na_2O$, % | .03–.05 | .02–.04 |
| $SO_4$, % | .03–.05 | .03–.05 |
| pH | 8–9 | 8–9 |
| Surface Area, $m^2/g$ | 300–350 | 400–450 |
| Pore Volume, cc/g | 1.0–1.1 | 1.0–1.1 |

It is noted that not only do the properties of the hydrogel prepared according to the process of this invention compare favorably with conventional bulk processing in most respects, the hydrogel processed according to this invention also showed an important in lower soda content and about a 30 percent increase in surface area. In many uses, the presence of soda ($Na_2O$) is considered a contaminant. The higher surface area increases the adsorptive capacity of the gel. In addition, processing the hydrogel according to this invention is much more rapid and does not require the extensive equipment employed in conventional bulk tank washing.

EXAMPLE 2

The procedure of Example 1 was repeated except that the silica hydrogel was not ammonia treated at pH 8.5 after being cut, dropped into the tank and slurried to give an $SiO_2$ content of 8 to 10 percent. The deletion of this step yields a silica having a lower pore volume. The resulting silica had the following chemical and physical properties:

| | |
| --- | --- |
| Total Valatile content, % | 72–75 |
| $Na_2O$, % | .03–.05 |
| $SO_4$, % | .03–.05 |
| pH | 8 |
| Surface Area, $m^2/g$ | 750–800 |
| Pore Volume, cc/g | .45 |

This silica is conventionally used as a desiccant.

What is claimed is:

1. A process for removing soluble impurities from a silica hydrogel which comprises providing an aqueous slurry of silica hydrogel particles having a particle size up to about 4 mesh, depositing said slurry onto a moving belt operating under vacuum drawn on the underside of said belt throughout the length thereof, vacuum dewatering said slurry in a first zone of said belt, treating the dewatered particles with acidified water in an amount to maintain said particles in a saturated condition in a second zone of said belt, thereby removing soluble cations, and treating the resulting particles with an aqueous alkaline solution in an amount to maintain said particles in a saturated condition in a third zone of said belt, thereby removing soluble anions.

2. A process according to claim 1 wherein said vacuum consists of a pressure of about 1 to 300 mm of Hg.

3. A process according to claim 2 wherein the acidified water contains .5 to 5 percent of sulphuric acid.

4. A process according to claim 3 wherein the acidified water contains 1.5 to 2.5 percent of sulphuric acid.

5. A process according to claim 3 wherein the aqueous alkaline solution is ammoniated water.

6. A process according to claim 5 wherein the ammoniated water has a pH ranging between 8.0 and 10.

7. A process according to claim 6 wherein the ammoniated water has a pH of between 9.0 and 9.5.

8. A process according to claim 6 wherein said silica hydrogel is prepared by reacting an aqueous solution of an alkali metal silicate and a mineral acid.

9. A process according to claim 8 wherein the silicate is sodium silicate and the acid is sulphuric acid.

10. A process according to claim 8 wherein said silica hydrogel is ammonia solution treated prior to depositing on said moving belt.

11. A process according to claim 6 wherein said silica hydrogel is prepared by reacting an aqueous solution of an alkali metal silicate with carbon dioxide.

* * * * *